United States Patent
Sing et al.

(10) Patent No.: US 8,001,694 B2
(45) Date of Patent: Aug. 23, 2011

(54) FIXED LINE ROTARY HEAD TRIMMER WITH QUICK FRICTION ROTATIONAL LOCK FOR STRING TRIMMER MACHINE

(75) Inventors: Jack B. Sing, Chandler, AZ (US); Neil G. Griffin, Chandler, AZ (US)

(73) Assignee: MTD Products Inc, Valley City, OH (US)

( * ) Notice: Subject to any disclaimer, the term of this patent is extended or adjusted under 35 U.S.C. 154(b) by 511 days.

(21) Appl. No.: 12/288,594

(22) Filed: Oct. 22, 2008

(65) Prior Publication Data

US 2009/0100686 A1    Apr. 23, 2009

Related U.S. Application Data

(60) Provisional application No. 60/999,870, filed on Oct. 22, 2007.

(51) Int. Cl.
    *B26B 7/00*    (2006.01)
(52) U.S. Cl. .......................................... 30/276; 30/347
(58) Field of Classification Search ............... 30/276, 30/279.4, 300, 347, DIG. 5; 56/12.5, 12.7
    See application file for complete search history.

(56) References Cited

U.S. PATENT DOCUMENTS

| | | | |
|---|---|---|---|
| 4,054,992 A * | 10/1977 | Ballas et al. ................. 30/276 |
| 4,125,339 A * | 11/1978 | Pittinger et al. ............ 403/348 |
| 4,259,782 A | 4/1981 | Proulx |
| 4,476,632 A | 10/1984 | Proulx |
| 4,571,831 A * | 2/1986 | White, III ................... 30/276 |
| 4,756,146 A * | 7/1988 | Rouse ......................... 56/12.7 |
| 4,959,904 A | 10/1990 | Proulx |
| 5,023,998 A * | 6/1991 | Masciarella et al. ......... 30/276 |
| 5,109,607 A | 5/1992 | Everts |
| 5,339,526 A * | 8/1994 | Everts ............................ 30/276 |
| 5,659,960 A | 8/1997 | Everts et al. |
| 5,671,536 A | 9/1997 | Everts et al. |
| 5,758,424 A | 6/1998 | Iacona et al. |
| 5,806,192 A | 9/1998 | Everts et al. |
| 5,887,348 A * | 3/1999 | Iacona et al. ................ 30/276 |
| 5,896,666 A | 4/1999 | Iacona et al. |
| 5,979,064 A * | 11/1999 | Kitz et al. .................... 30/347 |
| 6,035,618 A * | 3/2000 | Fogle ........................... 56/12.7 |
| 6,094,825 A * | 8/2000 | Hinson ......................... 30/276 |
| 6,108,914 A * | 8/2000 | Sheldon ........................ 30/276 |
| 6,148,523 A | 11/2000 | Everts et al. |
| 6,314,848 B2 * | 11/2001 | Morabit et al. ................ 83/13 |
| 6,401,344 B1 * | 6/2002 | Moore et al. ................. 30/347 |
| 6,457,242 B1 * | 10/2002 | Fogle ............................ 30/347 |
| 6,581,292 B2 | 6/2003 | Allis |
| 6,601,373 B1 * | 8/2003 | Legrand ....................... 56/12.7 |
| 6,854,185 B1 * | 2/2005 | Alliss ........................... 30/276 |
| 6,925,789 B2 * | 8/2005 | Lin ............................... 56/12.7 |
| 6,952,877 B2 * | 10/2005 | Pfaltzgraff .................... 30/276 |
| 6,983,543 B2 * | 1/2006 | Fogle ............................ 30/347 |

(Continued)

*Primary Examiner* — Sean Michalski
(74) *Attorney, Agent, or Firm* — Wegman, Hessler & Vanderburg (57) ABSTRACT

A trimmer head which receives fixed-length trimmer line segments has a housing with a side wall forming an open end with opposed holes formed therein. The trimmer head receives an insert that is rotated by the main housing. The insert has an arcuate channel from the first hole to the second hole adjacent the opposed side of the insert body when the insert body is in a load/unload position. The insert body is rotatable and movable axially with respect to the housing to an operational position where the line segment is forced to take an indirect path between the first and second holes securing the line segment in place during use of the trimmer head.

17 Claims, 7 Drawing Sheets

U.S. PATENT DOCUMENTS

| | | |
|---|---|---|
| 7,412,768 B2 | 8/2008 | Alliss |
| 7,665,215 B2 * | 2/2010 | Fogle ................................ 30/276 |
| 7,882,642 B2 * | 2/2011 | Proulx ............................. 30/276 |
| 2002/0026714 A1 * | 3/2002 | Peterson et al. ................. 30/276 |
| 2005/0126017 A1 * | 6/2005 | Fogle ................................ 30/347 |
| 2006/0048396 A1 * | 3/2006 | Legrand ........................... 30/276 |
| 2006/0053635 A1 * | 3/2006 | Legrand ........................... 30/276 |
| 2006/0053636 A1 * | 3/2006 | Fogle ................................ 30/276 |
| 2006/0090350 A1 * | 5/2006 | Legrand ........................... 30/276 |
| 2007/0251101 A1 * | 11/2007 | Shibasaki et al. ................ 30/276 |
| 2008/0052917 A1 * | 3/2008 | Proulx ............................. 30/276 |
| 2008/0127496 A1 * | 6/2008 | Proulx ............................. 30/276 |
| 2010/0064530 A1 * | 3/2010 | Pfaltzgraff ....................... 30/276 |
| 2011/0000091 A1 * | 1/2011 | Proulx ............................. 30/276 |

* cited by examiner

FIXED LINE ROTARY HEAD TRIMMER WITH QUICK FRICTION ROTATIONAL LOCK FOR STRING TRIMMER MACHINE

CROSS REFERENCE TO RELATED APPLICATIONS

This application claims the priority benefit of U.S. Provisional Patent Application Ser. No. 60/999,870 filed Oct. 22, 2007.

BACKGROUND OF THE INVENTION

1. Field of Invention

This invention relates generally to the field of lawn and garden tools and, more particularly, to a fixed-line trimmer device for use in cutting vegetation.

2. Description of Related Art

Rotary string trimmers are commonly used for trimming grass and other vegetation in areas not accessible by conventional lawn mowers. These line trimmers are typically powered by either a small engine or electric motor mounted and have a rotary line trimmer head connected to a drive spindle which is rotatably mounted on the end of an elongated boom. One or more segments of 0.05 to 0.10 inch diameter cutting line extend radially outward from the line trimmer head.

During use, the cutting portion of the line becomes damaged and needs to be replaced. A number of varying mechanisms to achieve line replacement have been developed over the years. The most common technique is to include a spool of line within the head and incrementally advance the line, thereby extending the cutting line to replace the damaged portion. This type of trimmer typically has a bump head in which the line incrementally advances in response to the trimmer head being bumped on the ground. Other trimmer heads are of the automatic variety in which the line incrementally advances in response to a significant change in rotational speed of the trimmer head, i.e., reducing the engine to idle and then resuming full operational speed.

The problem associated with spool-type trimmer heads is that the line may become tangled within the spool or welded to itself during periods of extended heavy use. Therefore, there is a trend toward using trimmer heads which utilize fixed-length line segments which are simply discarded when worn and replaced with a new line segment. While this results in a smaller percentage of the line being actually used, the tangling problems are eliminated and heavier line gauges may be utilized. Heavier line gauges extend the interval of time between line replacements.

A variety of fixed line trimmer heads have been developed. Some utilize line segments which have an enlarged head formed thereon to retain the line to the trimmer head. Others use uniform cross-section segments of line that may be severed from a large spool. Uniform cross-section line enables the replacement line to be easily obtained from convenient low cost sources. Problems, however, occur in simply and securely attaching the line segment to the trimmer head while also permitting the line segment to be quickly replaced.

SUMMARY OF THE INVENTION

One embodiment of the invention is directed to a rotating trimmer head for a vegetation cutting tool configured to receive a fixed-length segment of trimmer line. The trimmer head includes a main housing having a cylindrically-shaped side wall, the side wall having first and second trimmer line holes formed therein at substantially diametrically opposed positions around the circumference of the main housing. The main housing is mounted on the cutting tool so as to be rotatable about a central axis by means of a drive shaft of the cutting tool. A flexible fixed-length cutting line segment is positioned such that the ends of the cutting line segment extend outwardly from the first and second trimmer line holes. The trimmer head also includes an insert body received in the main housing such that rotation of the main housing causes the insert body to rotate about the central axis. The insert body has a sleeve to provide for passage of the drive shaft of the cutting tool and an arcuate line-receiving channel that traverses the insert body such that the channel arcs around the central sleeve. When the insert body is positioned in the main housing in a load/unload position with respect to the main housing, one end of the channel is adjacent to the first trimmer line hole and the other end of the channel is adjacent to the second trimmer line hole such that the channel forms a substantially direct guide path P1 between the first and second trimmer line holes so as to facilitate insertion or withdrawal of the cutting line segment along the path P1. The insert body is movable with respect to the main housing in both a rotational and an axial direction from the load/unload position into an operational position. When the insert body is rotated to the operational position, the ends of the channel are moved away from the respective first and second trimmer line holes such that the cutting line segment is forced to take an indirect path P2 between the first and second trimmer line holes and through the arcuate channel to thereby frictionally secure the cutting line segment during rotation of the trimmer head. The trimmer head may also include a load spring that biases the insert body into the main housing.

These and other features and advantages of this invention are described in, or are apparent from, the following detailed description of various exemplary embodiments of the systems and methods according to this invention.

BRIEF DESCRIPTION OF THE DRAWINGS

The structure, operation, and advantages of the presently disclosed embodiment of the invention will become apparent when consideration of the following description taken in conjunction with the accompanying drawings wherein:

FIG. 6 is a perspective view of the insert body 32 of the trimmer head; and.

Corresponding reference characters indicate corresponding parts throughout the views of the drawings.

DETAILED DESCRIPTION OF EXEMPLARY EMBODIMENTS

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

Figure 1:
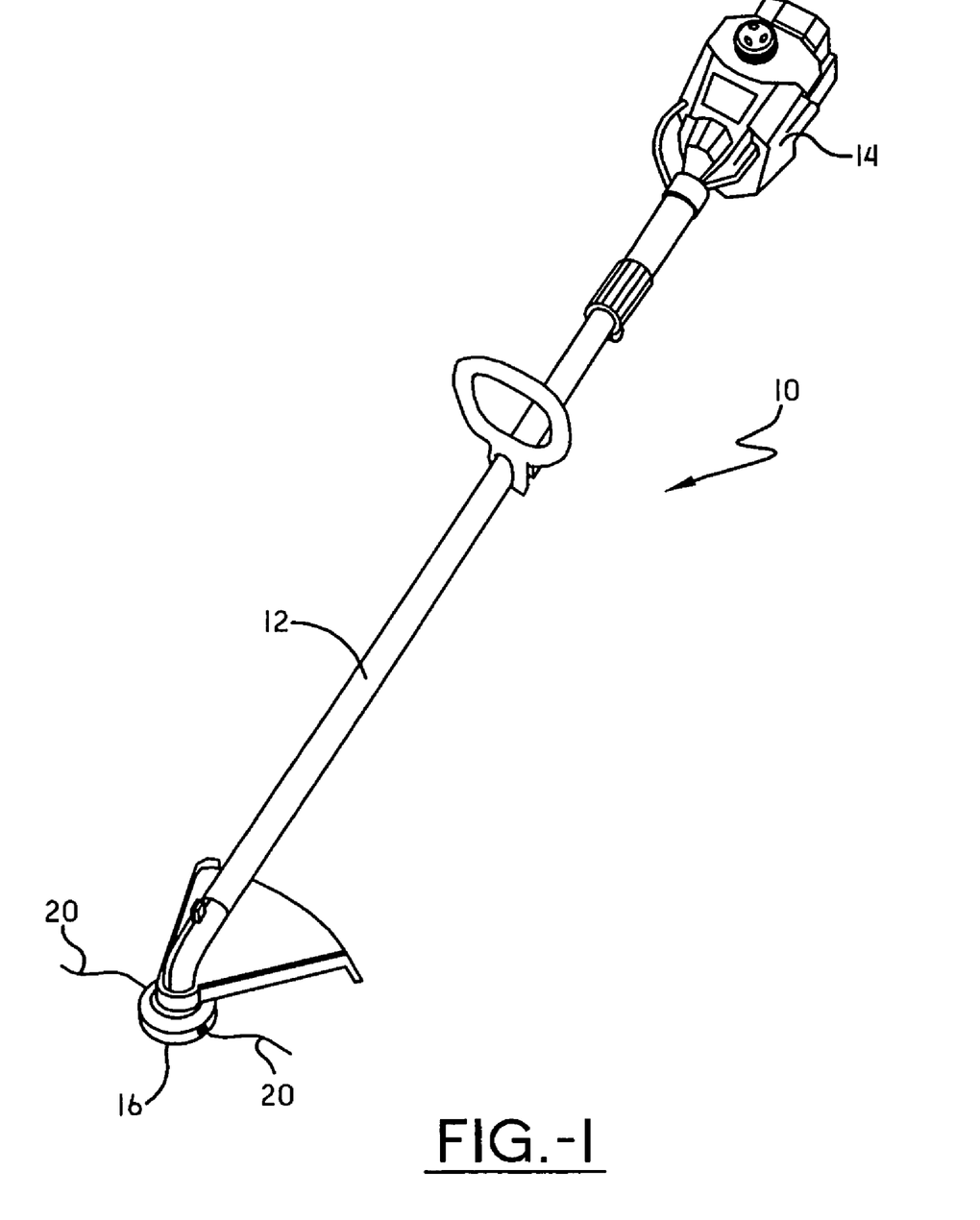
FIG. 1 is a perspective view of a string trimming machine having a trimmer head according to the invention.

Referring now to the drawings, FIG. 1 shows a portable, hand-held line trimmer tool 10 used to trim grass and other vegetation. As is customary in the art, the line trimmer tool 10 is provided with an elongated protective tubular shaft boom 12 with a power source 14 positioned at one end of the shaft boom 12 and at least one handle for manipulation of the trimmer machine 10. The power source 14 of the line trimmer tool 10 can be either a gasoline engine or an electric motor, both of which are well known in the art and need not be discussed in further detail. The trimmer machine 10 has a rotary trimmer head 16 connected to the working end of the shaft boom 12. As is known, the trimmer head 16 is rotated by a drive shaft 18 (FIG. 2) connected to the power source 14. According to the invention, the rotary trimmer head 16 utilizes a fixed-length segment of flexible cutting line 20 with opposing ends extending outwardly from the rotary head 16 to trim and cut vegetation. The speed of rotation for the rotary trimmer head 16 on typical line trimmer tools 10 ranges from about 6,000 RPM to approximately 12,000 RPM, with a typical operating speed on the order of about 8,000 RPM. Various factors can cause this speed to vary with any given machine, depending upon the length and the diameter of line 20 used.

Figure 2:
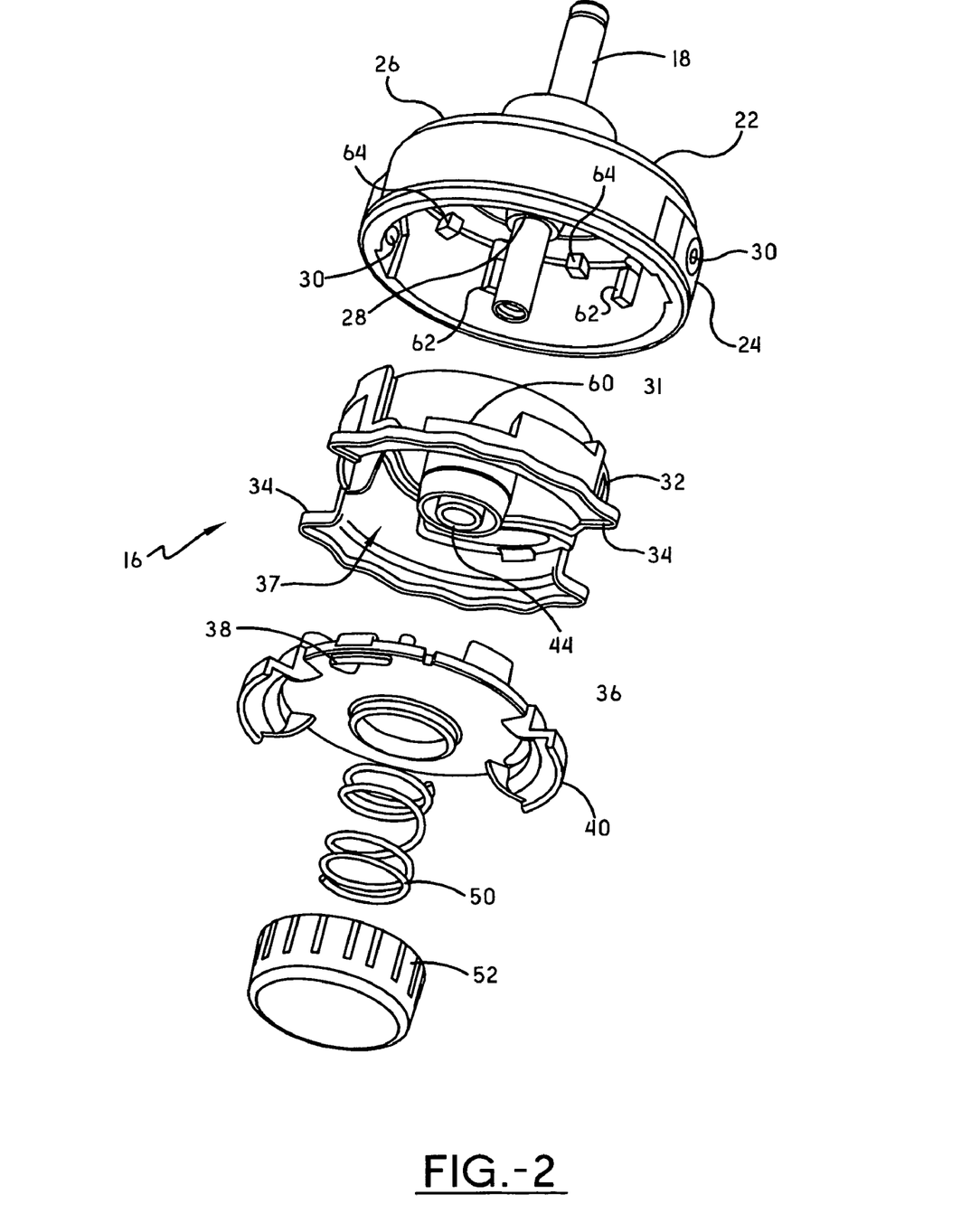
FIG. 2 is an exploded view of the string trimming head of FIG. 1.

As best seen in FIG. 2, the trimmer head 16 includes a generally bowl-shaped main housing 22 preferably made of molded plastic or other suitable material. The main housing 22 has a cylindrically-shaped side wall 24 with a substantially flat top portion 26. The top portion 26 has a circular hole or aperture 28 through it that is used to accommodate the drive shaft 18 of the line trimmer tool 10. The drive shaft 18 is secured to the main housing 22 by means of a suitable faster. A variety of different devices and techniques for attaching the drive shaft 18 to the main housing 22 are known in the art and may be used for the line trimmer tool 10 without departing from the scope of the invention. Since this attachment can be of any standard design, it need 0not be described in further detail.

The side wall 24 of the main housing 22 includes two diametrically opposed trimmer line holes or eyelets 30. Each of these holes 30 is formed or drilled through the side wall 24 such that they extend radially from the central axis of the main housing 22. It should be noted that the holes 30 are located in a position near the lower end 31 of the main housing 22. This general configuration of the main housing 22 as has been described thus far is comparable to the structure of the bump-and-feed line trimmer head shown in the commonly-assigned U.S. Pat. No. 6,148,523 issued to Everts et al.

Figure 3:
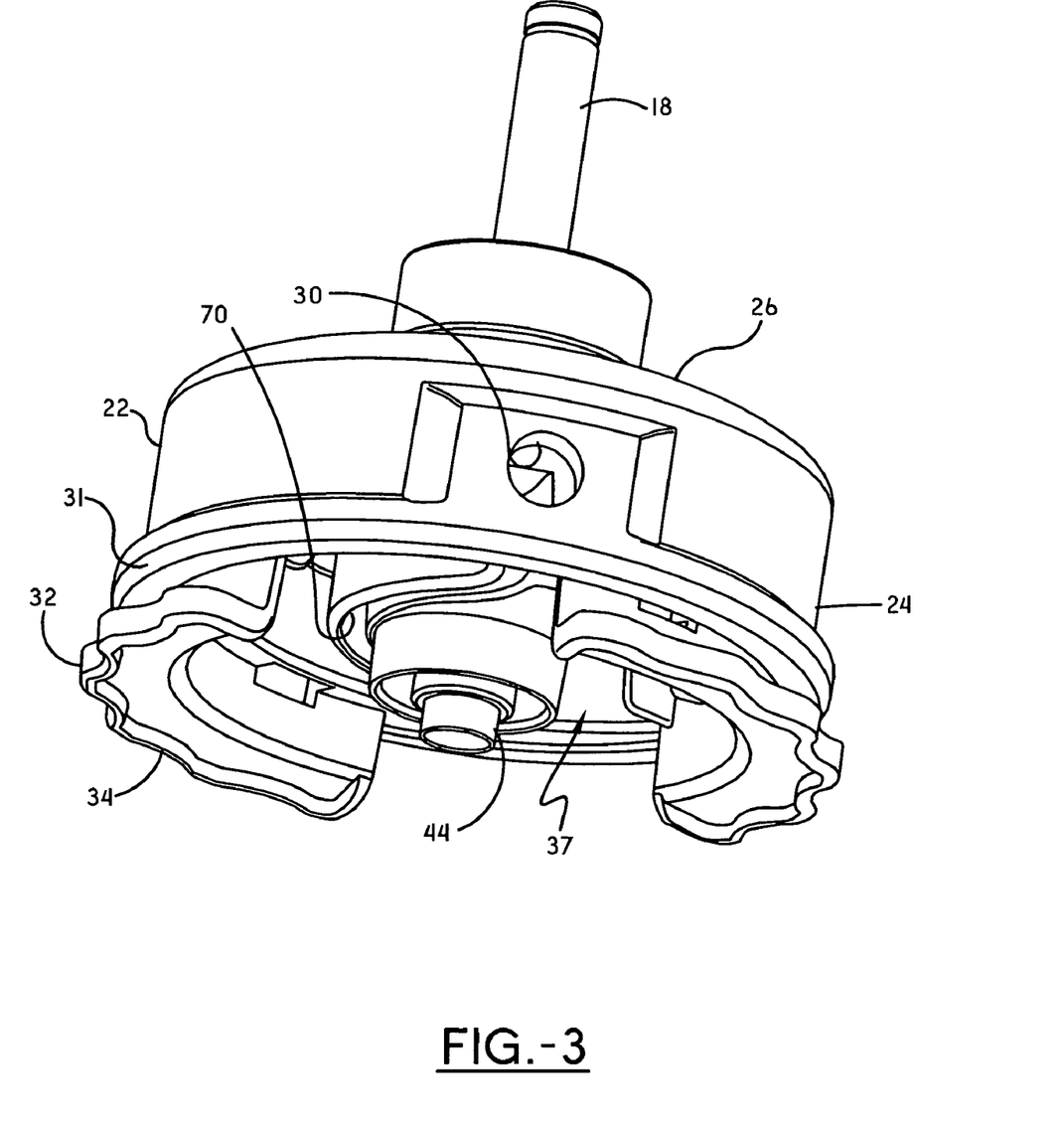
FIG. 3 is perspective view of components of the string trimming head of FIG. 2 in a load/unload configuration with the cover removed for clarity.

According to the invention, the lower end 31 of the main housing 22 is open and receives an insert body 32 configured to retain the fixed-length segment of trimmer line 20. The insert body 32 has a generally circular-shaped with flange portions 34 at its lower end. As best seen in FIG. 3, the flange portions 34 are designed to overlie the lower end 31 of the cylindrical side wall 24 of the main housing 22, with the outer diameter of the flange portions 34 being desirably slightly larger than the outer diameter of the main housing 22 to enable the user to grip the insert body 32 and rotate it with respect to the main housing 22. As seen in FIG. 2, the lower end of the insert body 32 receives a cover 36 to form a line retention compartment 37. Desirably, the cover 36 is permanently attached or snapped onto the insert body 32 with locking tabs (not shown) on the insert body 32 being received in slots 38 in the cover 36. However, other known arrangements for attaching the cover 36 to the insert body 32 may be used using sound engineering judgment without departing from the scope of the invention. The cover 36 substantially prevents grass clippings, dirt and other debris from entering the line retention compartment 37 and fouling the line segment securing ability of the insert body 32. In the illustrated embodiment, the cover 36 has flange portions 40 that mesh with the flange portions 34 of the main housing 22 to form a substantially continuous flange around the lower end 31 of the main housing 22. A central sleeve 44 is formed in the insert body 32 to receive the drive shaft 18. In one embodiment, the insert body 32 is used to replace a conventional bump-and-feed cartridge generally employed with line trimmer tools.

The insert body 32 is received into the main housing 22 after the main housing 22 is attached to the line trimmer tool 10. A load spring 50 biases the insert body 32 into the main housing 22, and the insert body 32 and load spring 50 are secured in the main housing 22 with a fastener 52 that is threaded onto the drive shaft 18 in a manner that is substantially similar to those used with conventional bump knobs. It is contemplated that the insert body 32 and load spring 50 can be secured in the main housing 22 with a fastener 52 in a variety of ways, including utilization of threaded fasteners, cotter pins, and the like.

When secured in the main housing 22, the insert body 32 rotates with the main housing 22 around its central axis as will be more fully discussed below. However, the insert body 32 can also be moved in the rotational direction and in the axial direction to a limited extent with respect to the main housing 22. Specifically, the insert body 22 can be rotated relative the main housing 22 between a load/unload position (shown in FIGS. 3 and 4) and an operational position (shown in FIG. 5). Rotation of the insert body 32 with respect to the main housing 22 is limited by interaction of a stop ledge 60 and ribs 62, 64 (best seen in FIG. 2) molded on the facing surfaces of the insert body 32 and main housing 22 as will be described more fully below.

Figure 4:
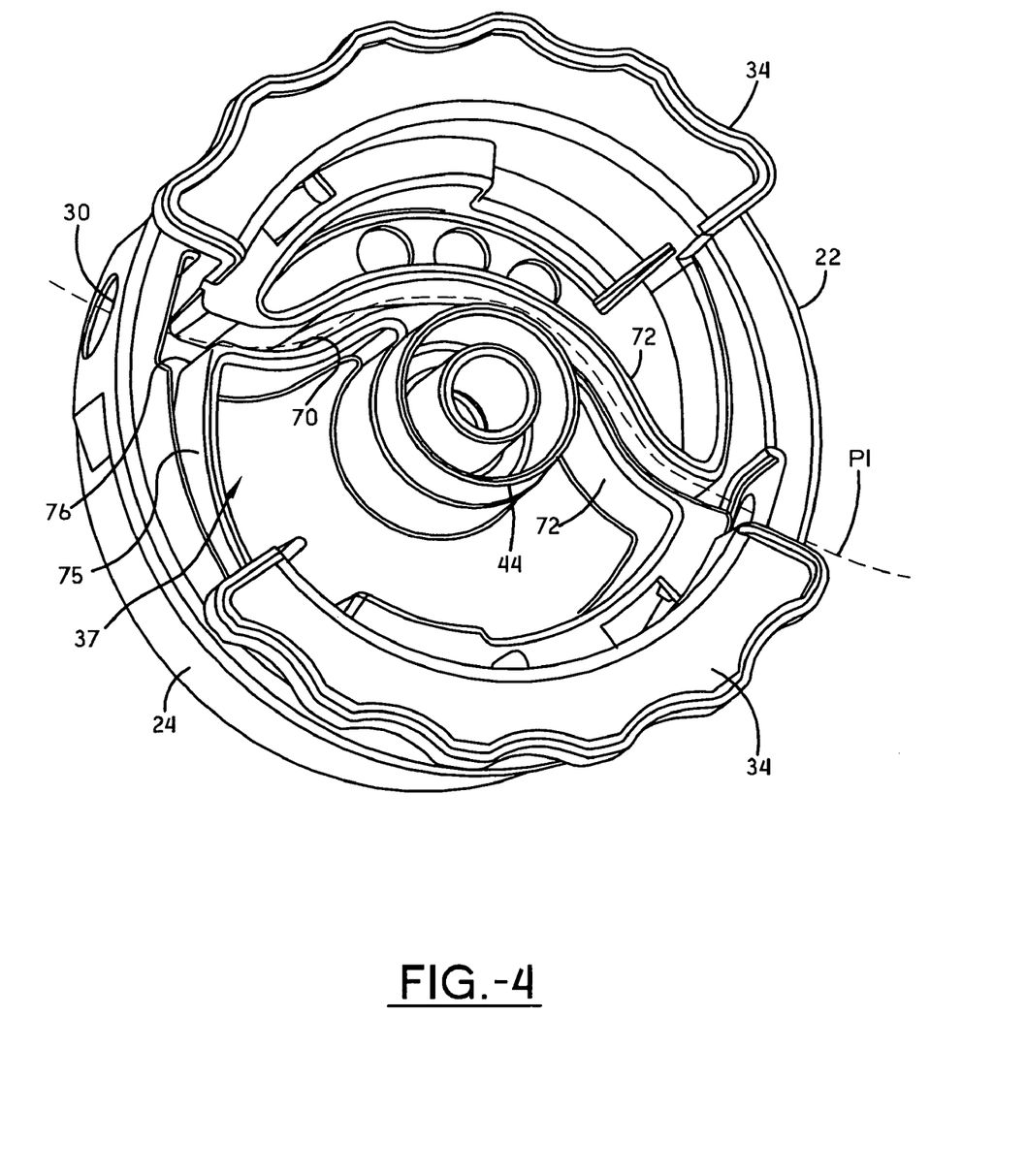
FIG. 4 is another view of components of the string trimming head of FIG. 2 in the load/unload configuration with the cover removed for clarity.
Figure 5:
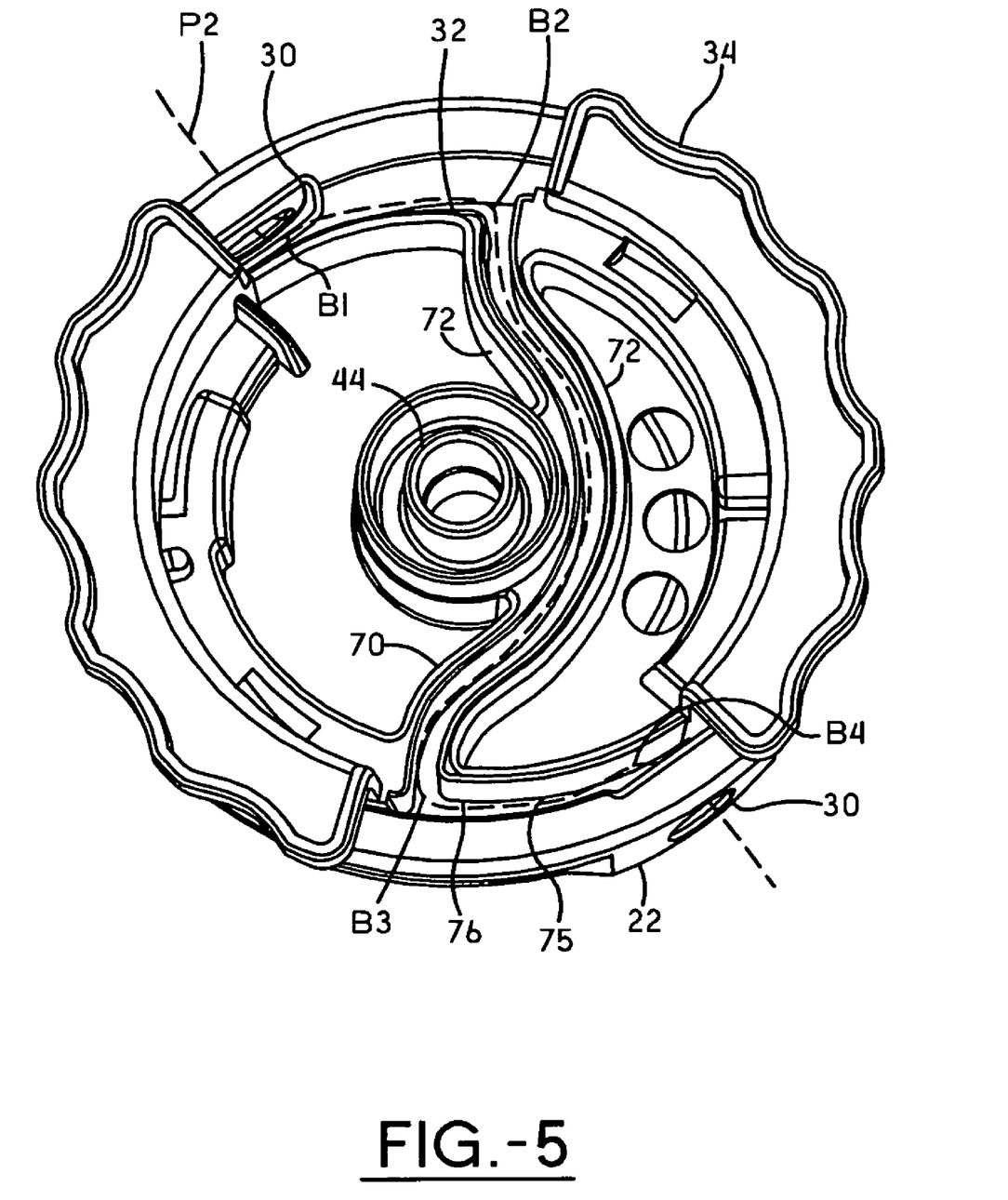
FIG. 5 is perspective view of components of the string trimming head of FIG. 2 in an operational configuration with the cover removed for clarity.

As best seen in the views of the insert body 32 with the cover 36 removed in FIGS. 4 and 5, an arcuate slot or channel 70 extends from one side of the insert body 32 to a position on the diametrically opposed side of the insert body 32 through the line retention compartment 37. Desirably, the channel 70 is formed by channel walls 72 molded in the insert body 32 to create a continuous path between the opposing sides of the insert body 32. As seen in the illustrated embodiment, the channel 70 has an arc shape such that it travels around the sleeve 44 of the insert body 32 that provides for passage of the drive shaft 18.

When the insert body 32 is in the load/unload position with respect to the main housing 22, the ends of the channel 70 align with the holes 30 in the main housing 22 to form a guide path P1 between the holes 30. This path P1 is indicated by a dotted line in FIG. 4. The insert body 32 is placed in the load/unload position when removing and installing the line segment, so in this configuration, it is desirable that the path P1 be substantially direct so as to allow for easy movement of the line segment along the path P1. It can be seen that when the line segment is inserted through the first entry hole 30, the line segment follows the substantially direct path P1 and is guided by the channel 70 to the hole 30 on the opposite side of the main housing 22. The path P1 is without any sharp bends or turns and follows the gradual arc shape of the channel 70 around the collar 44 of the insert body 32. The holes 30 in the main housing 22 and the ends of the channel 70 are substantially adjacent so that as the line segment is inserted through the first hole 30, it is aligned with the end of the channel 70. The width of the channel 70 is desirably selected to be slightly less than the diameter of the holes 30 so that upon reaching the end of the channel 70, the line segment easily exits the end of the channel 70 and passes out through the opposing hole 30. The user will then substantially equalize the line segment lengths extending from either side of the main body 22.

Once the line segment has been inserted in the rotary trimmer head 16, the insert body 32 is then rotated with respect to the main housing 22 back to the operational position. As the insert body 32 is rotated to the operational position, the line segment is forced to take an indirect path P2 between the holes 30 as shown in FIG. 5. This is the operating configuration assumed by the line segment during line trimmer tool 10 use, and this path geometry serves to secure the line segment in place during rotation of the trimmer head 16 and against accidental removal by an outward pulling force on either one of the free ends of the line segment extending out of the holes 30. As can be seen, in this orientation, path P2 has four bends, B1-4, that are between about 80 and 120 degrees when looking at the insert body 32 from a direction generally parallel to its rotational axis.

Desirably, the circumferential outer surface 75 of the insert body 32 leading to the channel 70 contains a tapered inlet 76. As shown in FIG. 5, the use of a tapered inlet 76 permits the line segment extending through the openings 30 to flex without bending the line segment at too sharp of an angle during operation of the line trimmer tool 10. This further reduces the likelihood of excessively sharp bends occurring which would otherwise tend to prematurely break off portions of the line segment if the tapered inlets 76 were not provided.

Figure 6:
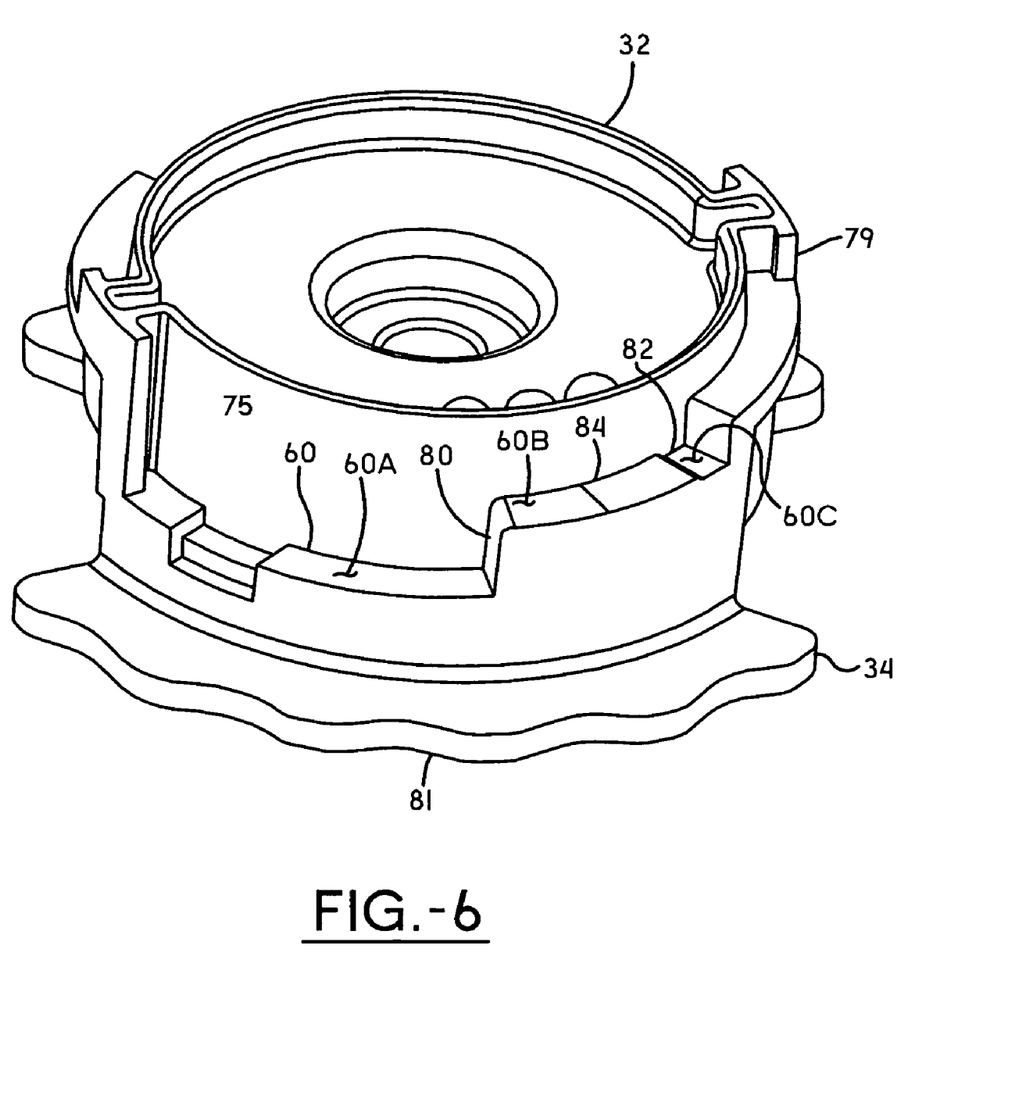
Figure 7:
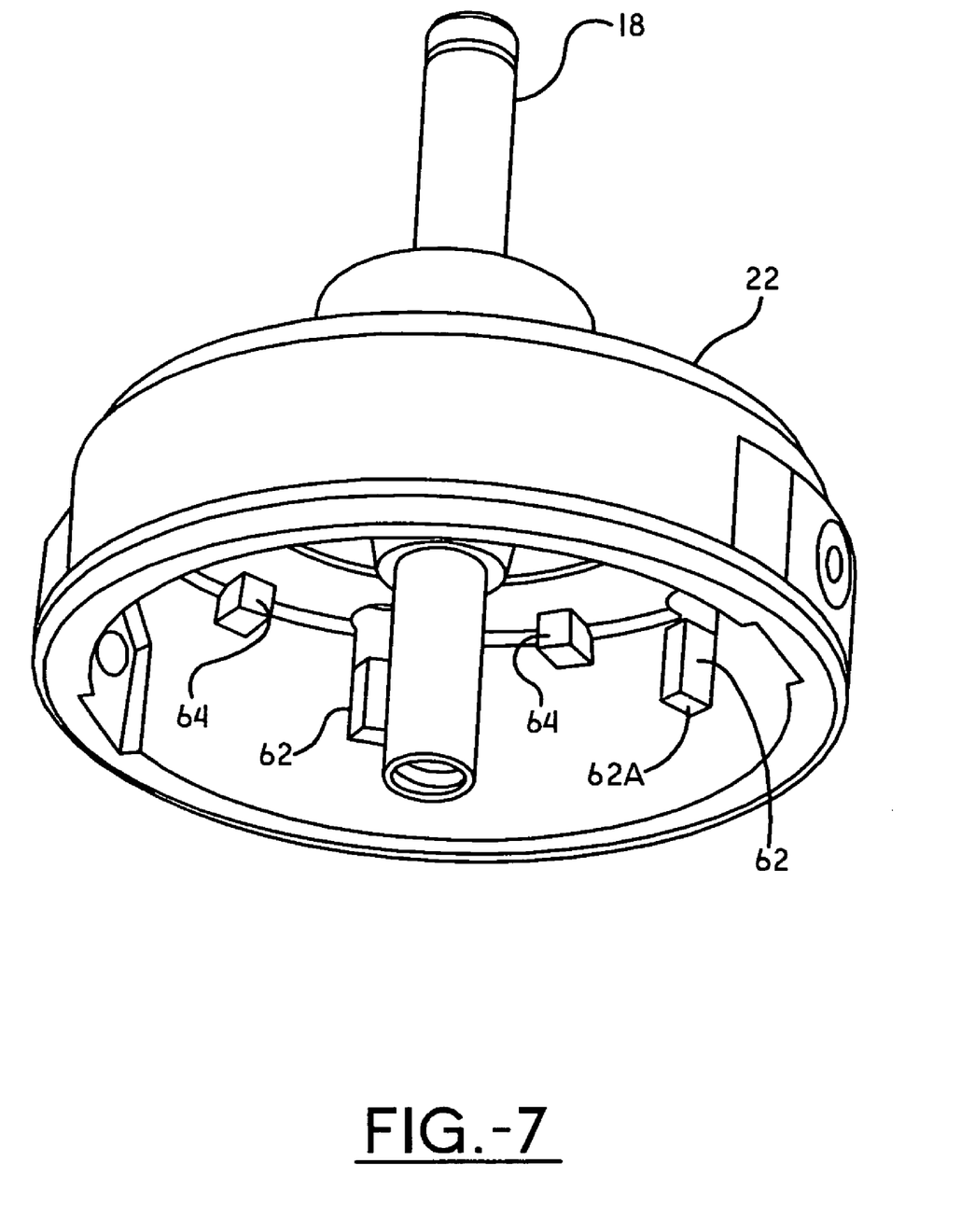
FIG. 7 is a perspective view of the main housing of the trimmer head.

Turning now to FIGS. 6 and 7, rotational and axial movement of the insert body 32 with respect to the main housing 22 is guided by the interaction of a multi-surfaced ledge 60 molded on the outer surface 75 of the insert body 32 with ribs 62 and 64 located on the facing interior surface of the main housing 22 (best seen in FIG. 7). The view of FIG. 6 shows ledge 60 on one side of the insert body 32. However, it is to be understood that a second, substantially similar ledge (partially shown in the view of FIG. 6) may be included on the other side of the insert body 32, with the second ledge 60 interacting with a different set of ribs 62, 64 indexed about 180 degrees on the main housing 22 from the first set of ribs 62, 64. Interaction of the second ledge 60 and second set of ribs 62. 64 can be substantially identical to that of the first ledge and ribs and need not be discussed herein. In the operational position, stop 79 on the insert body 32 abuts the rib 64 on the interior wall of the main housing 22, causing the insert body 32 to rotate with the main housing 22 when the main housing 22 is rotated by the drive shaft 18.

During the trimmer line loading sequence, the insert body 32 is partially pulled out of the main housing 22 against the biasing force of the loading spring 50 and rotated a small distance to reposition the insert body 22 from its initial, operational position, with a first surface 60A of the ledge 60 resting against an end surface 62A of rib 62, to a second position with surface 60B of the ledge 60 adjacent the end surface 62A of rib 62. As seen in the illustrated embodiment, surface 60A and surface 60B of the ledge 60 are vertically-offset with surface 60A being closer to the end of the insert body 32 having the flange portion 34. By vertically-offset, it is meant that the surfaces have different vertical distances from the end of the insert body 32 that contains the flange 34, or otherwise described as vertical heights along the central axis of the insert body. Desirably, surface 60A and surface 60B are separated by a substantially vertical step 80 in the ledge 60. The loading spring 50 biases surface 60A of the ledge 60 against the end surface 62A of the rib 62 such that in order to reposition the insert body 32 from the operational position, the operator must grasp the flange portions 34, 40 and pull the insert body 32 against the spring force away from the top portion 26 of the main housing 22. The fastener 52 prevents the insert body 32 from being completely withdrawn from the main housing 22. Desirably, the flange portions 34 and/or 40 are contoured with finger grips 81 to aid the user in grasping and rotating the insert body 32. The flange portions 34 and/or 40 may also contain labels or lettering providing instructions on which way to turn the insert body 32 and/or marks indicating when the insert body 32 is in the load/unload position and the channel 70 is aligned with the holes 30 in the main housing 22.

When the rib 62 has cleared the step 80, the insert body 32 can be rotated such that the end surface 62A of the rib 62 rests against surface 60B of the ledge 60 and the insert body 32 remains in its partially withdrawn position. Further rotation of the insert body 32 causes the end surface 62A of rib 62 on the main housing 22 to be positioned against a third surface 60C in the ledge 60. Surface 60C of the ledge 60 desirably has a vertical height that is different than the height of the adjacent surface 60B. Desirably, the height of surface 60C in the ledge 60 is intermediate the height of surfaces 60A and 60B. The third surface 60C forms a rib-receiving notch 82 in the ledge 60 with surface 60C of the ledge 60 being forced against the end surface 62A of the rib 62 by the spring 50. The rib 62 is positioned in the notch 82 when the insert body 32 is in its load/unload position. Interaction of the rib 62 with the notch 82 locks the trimmer head 16 for unloading and loading the line. Desirably, the user feels and or hears a click when the insert body 32 reaches the load/unload position and the rib 62 is forced into the notch 82 by force of the loading spring 50. In one embodiment, surface 60B of the ledge 60 contains a ramp portion 84. The ramp portion 84 creates a smoother transition during the rotation of the insert body 32 into its load/unload position.

To return the insert body 32 to the operational position and secure the trimmer line 20 in the rotary head 16, the operator pulls out on the insert body 32 to remove the rib 62 from the notch 82 and rotates the insert body in the opposite direction to return it to the operational position. Pressure by the spring 50 will help the rib 62 slide down the ramp 84 and past the step 80 to lock the insert body 32 back in the operational position.

Although in the illustrated embodiment the ribs 62 and 64 are shown in the interior of the main housing 22 and the ledge 60 on the exterior of the insert body 32, one skilled in the art will understand that these locations could be reversed. However, the illustrated embodiment is preferable because many string trimmers currently on the market already have main housings 22 that already possess suitable ribs 62 and 64. Therefore, these string trimmers could be retrofitted with the insert body 32 such that the consumer could have the option of using either a conventional bump-and-feed system or the fixed line system disclosed herein. In some of these conventional string trimmers, the main housing 22 may have several ribs 62 and 64 around the interior circumference of the main housing. It is understood that excess ribs 62 and 64 need not be used with the insert body 32 described herein.

As can be seen, the line segment following path P2 not only has the horizontal component of the four bends B1-4 as it traverses the path P2 between the holes 30 and the channel 70, but there are also vertical components to the bends, i.e., along the axis of rotation of the trimmer head 16, in the line segment caused by the insertion of the insert body 32 into the main housing 22 when it is returned to the operational position due to the height difference between surface C and surface A of the ledge 60 of the insert body. These vertical bends also tend to secure the line segment in the rotary trimmer head 16.

Although the fixed line trimmer head which has been described above is illustrated as providing a single trimmer line segment with ends extending on opposite sides of the string trimmer head 16, it is possible to provide additional sets of holes 30 and an additional channel 70 so that a pair of line segments may be used with four different holes 30 located, for example, at 90 degree intervals around the periphery of the main housing 22.

While this invention has been described in conjunction with the specific embodiments described above, it is evident that many alternatives, combinations, modifications and variations are apparent to those skilled in the art. Accordingly, the preferred embodiments of this invention, as set forth above are intended to be illustrative only, and not in a limiting sense. Various changes can be made without departing from the spirit and scope of this invention.

The invention claimed is:

1. A rotating trimmer head for a vegetation cutting tool configured to receive a fixed-length segment of trimmer line, the trimmer head comprising:
a main housing having a cylindrically-shaped side wall, said side wall having first and second trimmer line holes formed therein at substantially diametrically opposed positions around the circumference of the main housing, wherein the main housing is mounted so as to be rotatable about a central axis by means of a drive shaft of the cutting tool;
a flexible fixed-length cutting line segment positioned such that ends of the cutting line segment extend from the first and second trimmer line holes;
a substantially rigid insert body received in the main housing such that rotation of the main housing causes said insert body to rotate about the central axis, the insert body having a sleeve to provide for passage of the drive shaft of the cutting tool and an arcuate line-receiving channel that traverses said insert body such that the channel arcs around said central sleeve, wherein when the insert body is positioned in the main housing in a load/unload position with respect to the main housing, one end of the channel is adjacent to the first trimmer line hole and the other end of the channel is adjacent to the second trimmer line hole such that the channel forms a substantially direct guide path P1 between the first and second trimmer line holes so as to facilitate insertion or withdrawal of the cutting line segment along the path P1, the insert body being movable without deformation with respect to the main housing in both a rotational and an axial direction from said load/unload position into an operational position, and when the insert body is rotated to the operational position, the ends of the channel are moved away from the respective first and second trimmer line holes such that the cutting line segment is forced to take an indirect path P2 between the first and second trimmer line holes and through said arcuate channel to thereby frictionally secure the cutting line segment during rotation of the trimmer head.

2. The trimmer head of claim 1 further comprising a load spring that biases the insert body into the main housing.

3. The trimmer head of claim 2 wherein rotational and axial movement of the insert body with respect to the main housing is guided by the interaction of a ledge located on the outer surface of the insert body with a plurality of ribs located on the facing interior surface of the main housing, wherein said ledge has multiple offset surfaces formed therein, said multiple surfaces extending generally perpendicularly from the outer surface of the insert body.

4. The trimmer head of claim 3 wherein the insert body is partially pulled out of the main housing against the biasing force of the loading spring and rotated with respect to the main housing as guided by interaction of the multi-surfaced ledge with the ribs when repositioning the insert body from the operational position to the load/unload position.

5. The trimmer head of claim 4 wherein the insert body has at least one flange portion at its lower end, wherein the flange portion is designed to overlie the lower end of the cylindrical side wall of the main housing with the outer diameter of the flange portion being larger than the outer diameter of the main housing.

6. The trimmer head of claim 5 wherein in the ledge has a first surface and a second surface offset with the first surface, with the first surface being closer to the end of the insert body having the flange portion, and in the operational position the first surface of the ledge abuts a first rib on the main housing, and in the load/unload position the second surface abuts said rib.

7. The trimmer head of claim 6 wherein the first surface and second surface are separated by a substantially vertical step in the ledge.

8. The trimmer head of claim 7 wherein the loading spring biases the first surface of the ledge against the end surface of the first rib such that in order to reposition the insert body, the insert body must be partially withdrawn from the main housing against a biasing force of the spring.

9. The trimmer head of claim 8 wherein when the first rib has cleared the step, the insert body can be rotated such that the end surface of the first rib rests against the second surface of the ledge and the insert body remains in its partially withdrawn position.

10. The trimmer head of claim 9 wherein further rotation of the insert body causes the end surface of the first rib to be positioned against a third surface in the ledge, wherein the third surface has a vertical height that is different than the height of the adjacent second surface such that the third surface forms a rib-receiving notch in the ledge with the third surface of the ledge being forced against the first rib by the spring when the insert body is in its load/unload position.

11. The trimmer head of claim 10 wherein the second surface of the ledge contains a ramp portion.

12. The trimmer head of claim 1 wherein each of the diametrically opposed entrance points to the arcuate channel in the outer surface of the insert body comprise a tapered inlet, wherein the tapered inlet reduces the angle at which the line segment bends when in the operational position.

13. The trimmer head of claim 1 wherein the ledge further comprises a stop that abuts a second rib on the interior wall of the main housing, wherein interaction of the stop and the second rib cause the insert body to rotate with the main housing when the main housing is rotated by the drive shaft.

14. The trimmer head of claim 1 wherein the path P2 has four bends that are between about 80 and 120 degrees when looking at the insert body from a direction generally parallel to the central axis.

15. A substantially rigid insert to be received in a main housing of a rotating trimmer head on a vegetation cutting tool to configure the trimmer head to receive a fixed-length segment of trimmer line, the main housing being rotatable by a rotating drive shaft of the tool, wherein the main housing of the trimmer head has a cylindrically shaped side wall having first and second substantially diametrically opposed trimmer line holes formed therein and first and second ribs molded on the inside surface thereof, the insert comprising:

an insert body including a central sleeve to provide for passage of the drive shaft of the cutting tool;

an arcuate line-receiving channel that traverses said insert body such that the channel arcs around said central sleeve, wherein when the insert body is positioned in the main housing in a load/unload position with respect to the main housing, one end of the channel is adjacent to the first trimmer line hole and the other end of the channel is adjacent to the second trimmer line hole such that the channel forms a substantially direct guide path P1 between the first and second trimmer line holes so as to facilitate insertion or withdrawal of the cutting line segment along the path P1, and when the insert body is rotated without deformation to the operational position, the ends of the channel are moved away from the respective first and second trimmer line holes such that the cutting line segment is forced to take an indirect path P2 between the first and second trimmer line holes and through said arcuate channel to thereby frictionally secure the cutting line segment during rotation of the trimmer head;

a ledge located on the outer surface of the insert body having a plurality of vertically-offset surfaces extending generally perpendicularly from the outer surface of the insert, wherein rotational movement of the insert caused by the rotation of the housing and rotational and axial movement of the insert body with respect to the housing are guided by the interaction of the ledge with the plurality of ribs located on the facing interior surface of the main housing, wherein in the ledge comprises:

a stop that abuts the second rib on the interior wall of the housing, wherein interaction of the stop and the second rib causes the insert to rotate with the housing when the housing is rotated by the drive shaft;

a first surface, a second surface offset from the first surface, and a third surface offset from the first and second surfaces, with the first surface being closer to an outer end of the insert body, and in the operational position the first surface of the ledge is configured to abut the first rib on the main housing, and in the load/unload position the second surface abuts said rib, wherein the first surface and second surface are separated by a substantially vertical step in the ledge, wherein further rotation of the insert body causes said rib to be positioned against the third surface in the ledge, wherein the third surface forms a rib-receiving notch in the ledge with the third surface of the ledge being forced against the first rib by a spring when the insert is in its load/unload position.

16. The insert of claim 15 wherein the second surface of the ledge contains a ramp portion.

17. The insert of claim 16 wherein each of the diametrically opposed entrance points to the arcuate channel in the outer surface of the insert body comprise a tapered inlet, wherein the tapered inlet reduces the angle at which the line segment bends when in the operational position.

* * * * *